Figure 1:
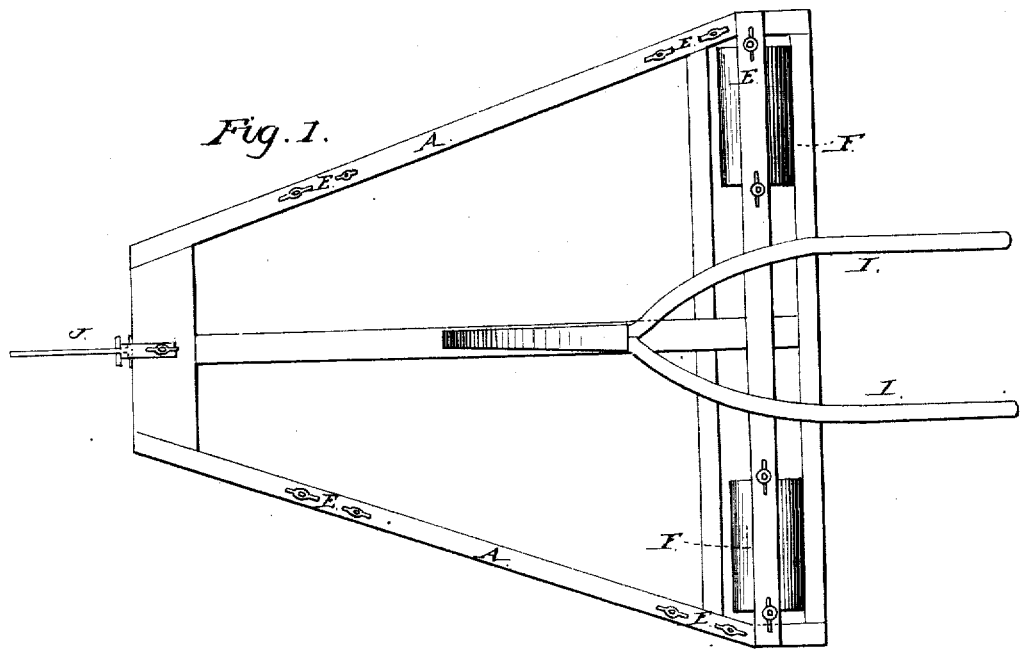

T. E. GARDINER.
Cultivator.

No. 64,967.

Patented. May 21, 1867.

Witnesses:

Inventor:

United States Patent Office.

T. ELZARE GARDINER, JR., OF BRYANTOWN, MARYLAND.

Letters Patent No. 64,967, dated May 21, 1867.

---

GANG-PLOUGH.

---

*The Schedule referred to in these Letters Patent and making part of the same.*

---

TO ALL WHOM IT MAY CONCERN:

Be it known that I, T. ELZARE GARDINER, of Bryantown, county of Charles, in the State of Maryland, have invented a new and improved Gang-Plough, &c.; and I do hereby declare that the following is a full and exact description thereof, reference being had to the accompanying drawings, making a part of this specification, in which like parts are indicated by like letters in the several figures.

The nature of my invention consists in so arranging and combining certain ploughs, harrows, rollers, &c., that at least two distinct and complete hills or ridges can be made at one ploughing or operation, each one having its opposite sides sloped, the top of these being harrowed by teeth behind the two pairs of ploughs, and after harrowing, the top surface of each ridge being rolled, forming a convex surface, the same rolling indicating a regular distance for the planting of the seed or the introduction of the sprouted germ or plants. In the drawings—

Figure 2:
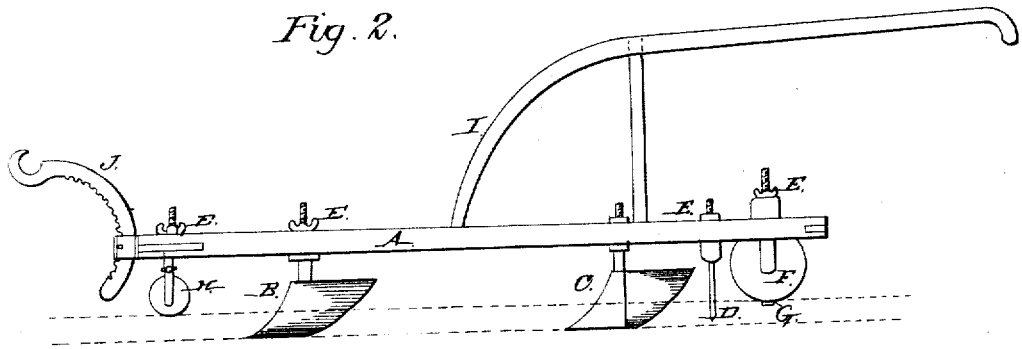

Figure 1 represents a plan view; and
Figure 2 a side elevation of my improved machine.

In said drawings, A A are two side bars, contracted at their forward, ends and braced in any suitable manner. These bars carry the mould-boards B B, C C, and harrows D, said mould-boards and harrows being adjustable in regard to height by means of thumb-screws E. The mould-boards are placed in pairs on each bar, but move in different lines, caused by the contraction of the forward ends of the bars, as shown in fig. 1. All the mould-boards are similar in construction, but their positions are reversed, the front ones B B turning the earth in a direction opposite to that in which the rear ones C C turn it. For instance, the mould-boards B B turn the earth outwards while the rear ones C C turn it inwards, thus not only forming two ridges at the same time, but by means of the front and rear mould-boards moving in different lines and turning the earth in different directions, the ridges are made more uniformly and perfectly than in the manner now practised. In the rear of the mould-boards C C are harrows D and rollers F, the harrow teeth disintegrating the earth, and the rollers being provided with projections G on their peripheries, mark the place for the seed or sprouted germ or plant at the same time. In the drawings the rollers are shown with only one projection each, but it is obvious that any number may be used if found necessary. In the forward end of the machine is a guide-wheel, H, which runs upon the surface of the ground. This wheel and the roller F may be raised or lowered in the same manner as the mould-boards and harrows. I I are the plough-handles for guiding and steadying the machine. J is an adjustable arm to which the horses may be hitched in any suitable manner.

It will be seen that by reversing the positions of the front and rear mould-boards, and causing them to move in different planes, the earth will be thrown up from opposite directions, and meeting midway between the lines in which the front and rear mould-boards work, the ridges thus formed will be more perfect and uniform than those made by machines of ordinary construction, and also that the combination of the plough, harrow, and roller effects a great saving in labor and a better cultivation of the soil. The side beams to which the ploughs are attached may be made adjustable so as to regulate the distance between the ridges; this by any well-known mechanical device.

Having thus described my invention, what I claim as new, and desire to secure by Letters Patent of the United States, is—

A gang-plough, constructed and operating in the manner substantially as shown and described.

T. ELZARE GARDINER, JR.

Witnesses:
S. S. FAHNESTOCK,
J. F. ZACHARIAS.